(12) United States Patent
Sviberg

(10) Patent No.: US 10,857,864 B2
(45) Date of Patent: Dec. 8, 2020

(54) TOP OF A CONVERTIBLE VEHICLE AND CONVERTIBLE VEHICLE HAVING SUCH A TOP

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 31 days.

(21) Appl. No.: 16/261,072

(22) Filed: Jan. 29, 2019

(65) Prior Publication Data

US 2019/0241051 A1 Aug. 8, 2019

(30) Foreign Application Priority Data

Feb. 5, 2018 (DE) .......................... 10 2018 102 520
Jul. 6, 2018 (DE) .......................... 10 2018 116 375

(51) Int. Cl.
*B60J 7/12* (2006.01)
*B60J 7/16* (2006.01)
*B60J 7/185* (2006.01)

(52) U.S. Cl.
CPC ............. *B60J 7/1265* (2013.01); *B60J 7/126* (2013.01); *B60J 7/1692* (2013.01); *B60J 7/1855* (2013.01)

(58) Field of Classification Search
CPC ......... B60J 7/1265; B60J 7/1856; B60J 7/126
USPC ................ 296/107.01, 109, 120.1, 121, 122
See application file for complete search history.

(56) References Cited

U.S. PATENT DOCUMENTS

2009/0085369 A1\* 4/2009 Willard ................. B60J 7/1265
    296/107.01
2014/0252795 A1\* 9/2014 Willard ................. B60J 7/1265
    296/108

\* cited by examiner

*Primary Examiner* — Dennis H Pedder
(74) *Attorney, Agent, or Firm* — Fitch, Even, Tabin & Flannery, LLP

(57) ABSTRACT

A top for a convertible vehicle, having a top cover and a top linkage which can be displaced between a covering position, in which a vehicle interior is covered, and a storage position, in which the vehicle interior is open at the top, and which may have, on either side of a vertical longitudinal center plane of the top, a link assembly having a four-bar linkage comprising a first main link, a second main link, and a coupling link, the first main link and the second main link each being pivotably mounted on a vehicle-attached main bearing, and a front bow which fixes the top to a front header of the vehicle in the covering position extending between the two link assemblies. The front bow is rigidly attached to the first main link of the respective four-bar assembly on either side.

10 Claims, 8 Drawing Sheets

TOP OF A CONVERTIBLE VEHICLE AND CONVERTIBLE VEHICLE HAVING SUCH A TOP

CROSS-REFERENCE TO RELATED APPLICATIONS

This application claims priority from German Patent Application Number DE 10,2018/102,520.3, filed Feb. 5, 2018, and German Patent Application Number DE 10,2018/116,375.4, filed Jul. 6, 2018, which is hereby incorporated herein by reference in its entirety for all purposes.

FIELD

The invention relates to a top of a convertible vehicle and to a convertible vehicle having such a top.

BACKGROUND

A top for a convertible vehicle is known from practice which comprises a top linkage which can be displaced between a closed position, in which a vehicle interior is covered, and a storage position, in which the vehicle interior is open at the top. The convertible vehicle has, on either side of a vertical longitudinal center plane of the top, a link assembly comprising two main links which are pivotably mounted on a vehicle-attached main bearing. Via additional roof links, a front bow is articulated to the link assembly. This involves high constructive complexity and requires a large amount of installation space. Furthermore, sufficient stability of the top is difficult to achieve with the top known from the state of the art.

SUMMARY

Therefore, the object of the invention is to provide a top of a convertible vehicle which is characterized by a simple mechanism, by increased stability, and by little installation space, and to provide a convertible vehicle having such a top.

According to the invention, said object is attained by the top having the features of claim 1 and by the convertible vehicle having the features of claim 9.

Thus, a top for a convertible vehicle is proposed, said top comprising a top cover and a top linkage which can be displaced between a covering position, in which a vehicle interior is covered, and a storage position, in which the vehicle interior is open at the top (i.e. uncovered). The top linkage has, on either side of a vertical longitudinal center plane of the top, a link assembly having a four-bar linkage. The four-bar linkage comprises a first main link, a second main link, and a coupling link. The first main link and the second main link are each pivotably mounted on a vehicle-attached main bearing. A front bow which fixes the top to a front header of the vehicle in the covering position extends between the two link assemblies. The front bow is rigidly attached to a respective main link of the four-bar linkage on either side.

In the proposed top, a main mechanism of the link assemblies that is required to displace the top linkage is, thus, preferably realized merely largely by the four-bar linkage which comprises the first link, the second link, and the coupling link. This constitutes a simple mechanism for displacing the top which requires little installation space. Additionally, owing to the simple geometrical design, the proposed top exhibits high stability, enables good fabric tension of a top cover, requires a small number of components and, thus, involves low costs and low weight.

In a specific embodiment of the top according to the invention, when the top is in the covering position, the coupling link extends substantially parallel to a leg of the first main link in the longitudinal direction of the vehicle and substantially at the same height as the leg of the first main link in the vertical direction of the vehicle. Thus, small structural height of the top linkage is achieved.

In a preferred embodiment of the top according to the invention, a four-bar linkage comprising a bow link, a control link, and a coupling link is connected to each first main link. At least one transverse bow which is rigidly attached to the bow links of the link assemblies and across which the top cover is stretched (tensioned) in the covering position can extend between the link assemblies disposed on either side of the vertical longitudinal center plane of the top.

In another embodiment of the top according to the invention, at least one transverse bow is rigidly attached to the second main links. The transverse bow extends in the transverse direction of the vehicle and connects the two link assemblies disposed on either side of the vertical longitudinal center plane of the top. In the covering position, the top cover is stretched across the transverse bow, the transverse bow being pivotable in a defined manner owing to its direct connection to the second main links.

In a specific embodiment of the top according to the invention, at least one bow link is pivotably mounted on each of the link assemblies, in particular on the second main links. A transverse bow can be rigidly attached to the bow links. Said transverse bow can be a corner bow which extends in a transverse direction of the top and which, when the top linkage is in the covering position, defines an area of transition of the top cover between a roof portion and a vehicle rear.

Also, a tensioning bow can be pivotably mounted on the vehicle-attached main bearings disposed on either side of the longitudinal center plane of the top, said tensioning bow connecting the vehicle-attached main bearings and serving to stretch (tension) the top cover in the longitudinal direction of the top in the covering position.

In a preferred embodiment of the top according to the invention, the first main link is substantially L-shaped, meaning it comprises a long leg and a short leg. The long leg extends in the longitudinal direction of the vehicle when the top linkage is in the covering position. The short leg, which is pivotably mounted on the vehicle-attached main bearing, extends in the vertical direction of the vehicle when the top linkage is in the covering position.

The long leg is a roof side beam, for example, which carries a weather strip, in particular a one-piece weather strip. When the top linkage is in the covering position, the front end of the first main link can reach the front header or come close to the front header of a vehicle body.

According to another aspect, a convertible vehicle comprising a top of the kind described above is proposed.

The convertible vehicle is an off-road vehicle or a sports utility vehicle, for example.

In the drawing, an embodiment of a convertible vehicle having a top according to the invention is illustrated in a schematically simplified manner and will be explained in more detail in the following description.

BRIEF DESCRIPTIONS OF THE DRAWINGS

DETAILED DESCRIPTION

Figure 1:
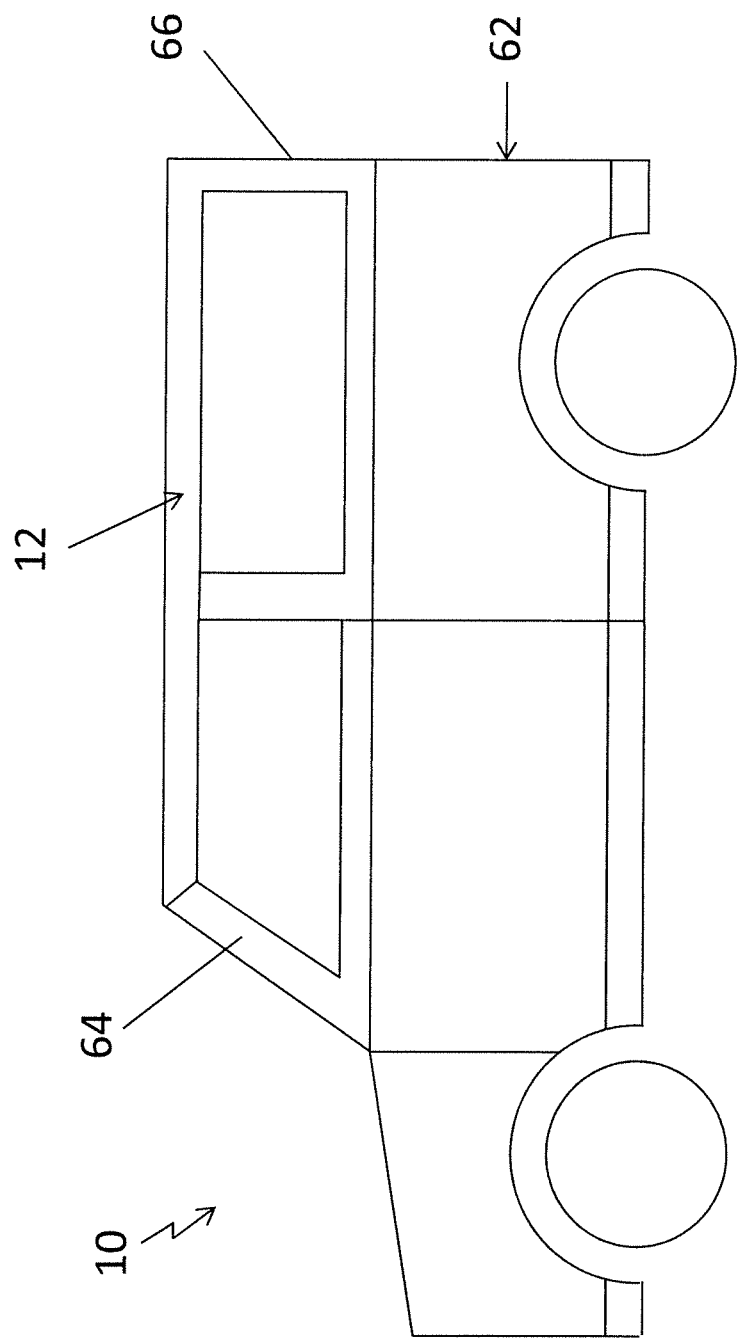
FIG. 1 is a schematic side view of a convertible vehicle realized an off-road vehicle with a top in its covering position.
Figure 2:
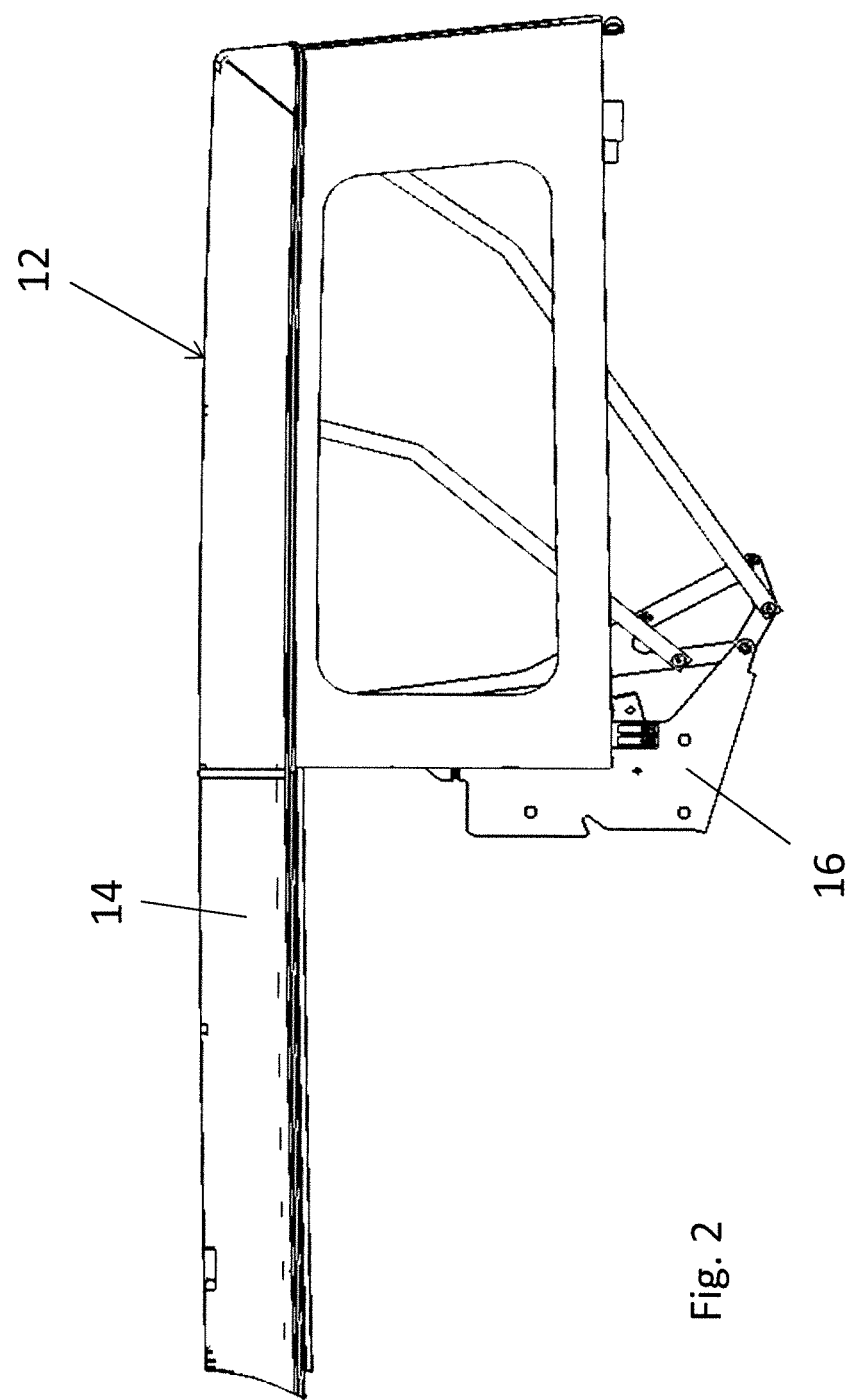
FIG. 2 is a side view of the top including a rear side window in the covering position.
Figure 3:
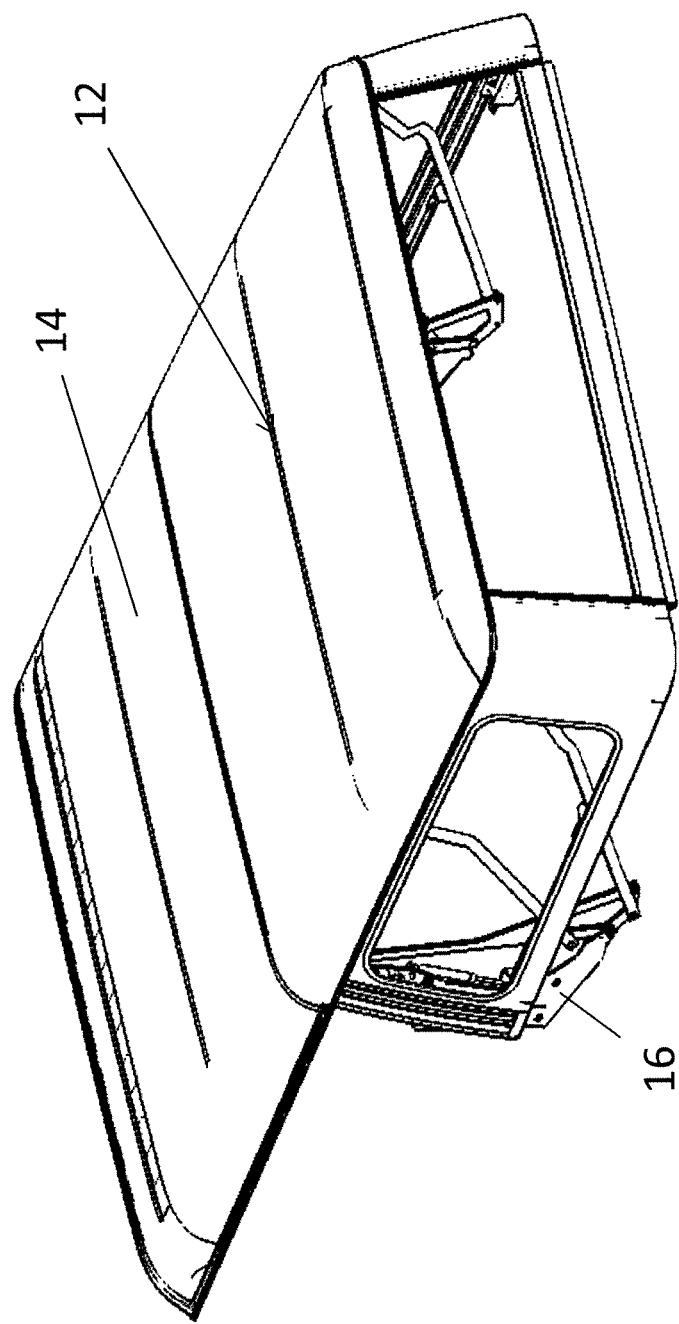
FIG. 3 is a perspective view of the top of FIG. 2 in the covering position.

FIG. 1 shows a convertible vehicle 10 being an off-road vehicle and comprising a vehicle body 62, which encloses a vehicle interior, and a vehicle roof in the form of a top 12. In a covering position as illustrated in FIGS. 1, 2, 3 and 5, top 12, which is a folding top, extends between a front header 64, which forms an upper leg of a windshield frame extending in the transverse direction of the vehicle, and a rear edge extending in the transverse direction of the vehicle and forming an area of transition to a vehicle rear 66.

Figure 4:
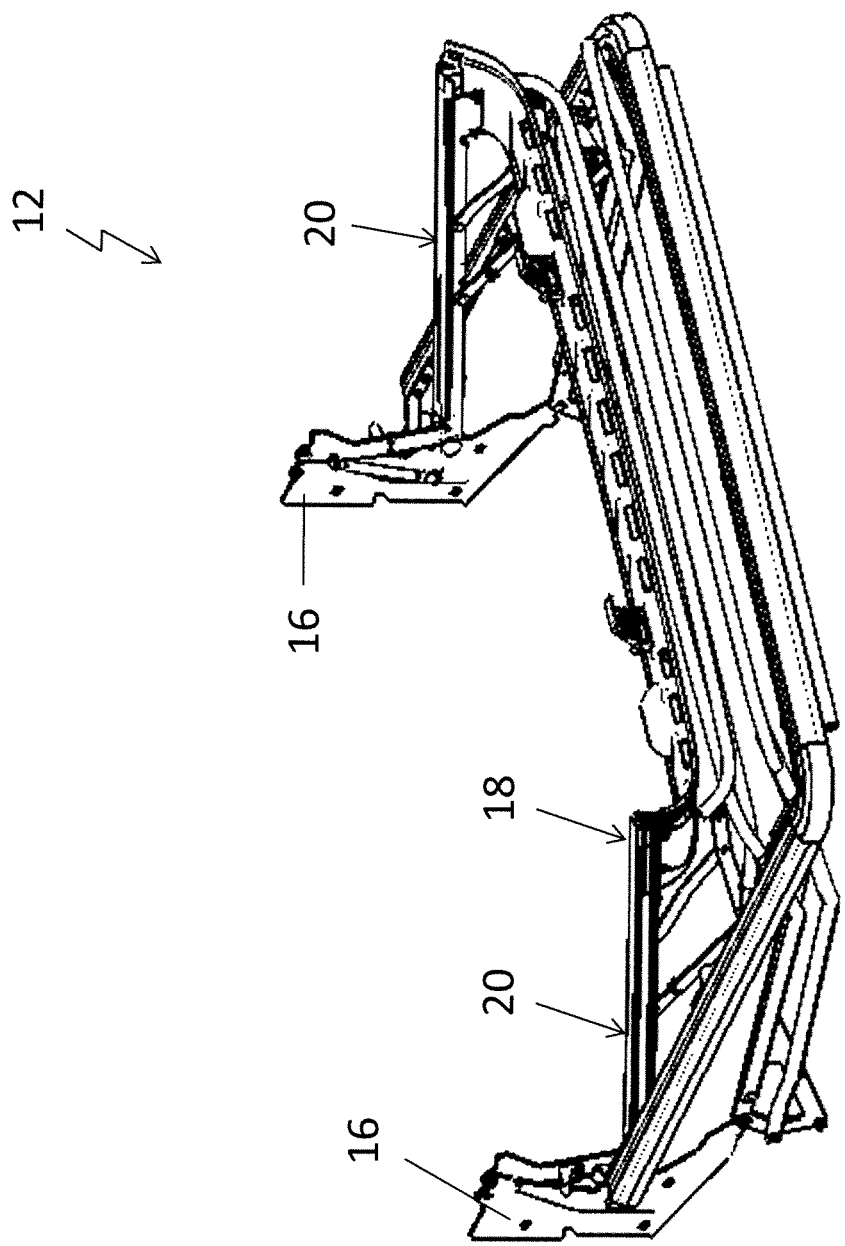
FIG. 4 is a perspective view of the top of FIG. 2 in a storage position.
Figure 5:
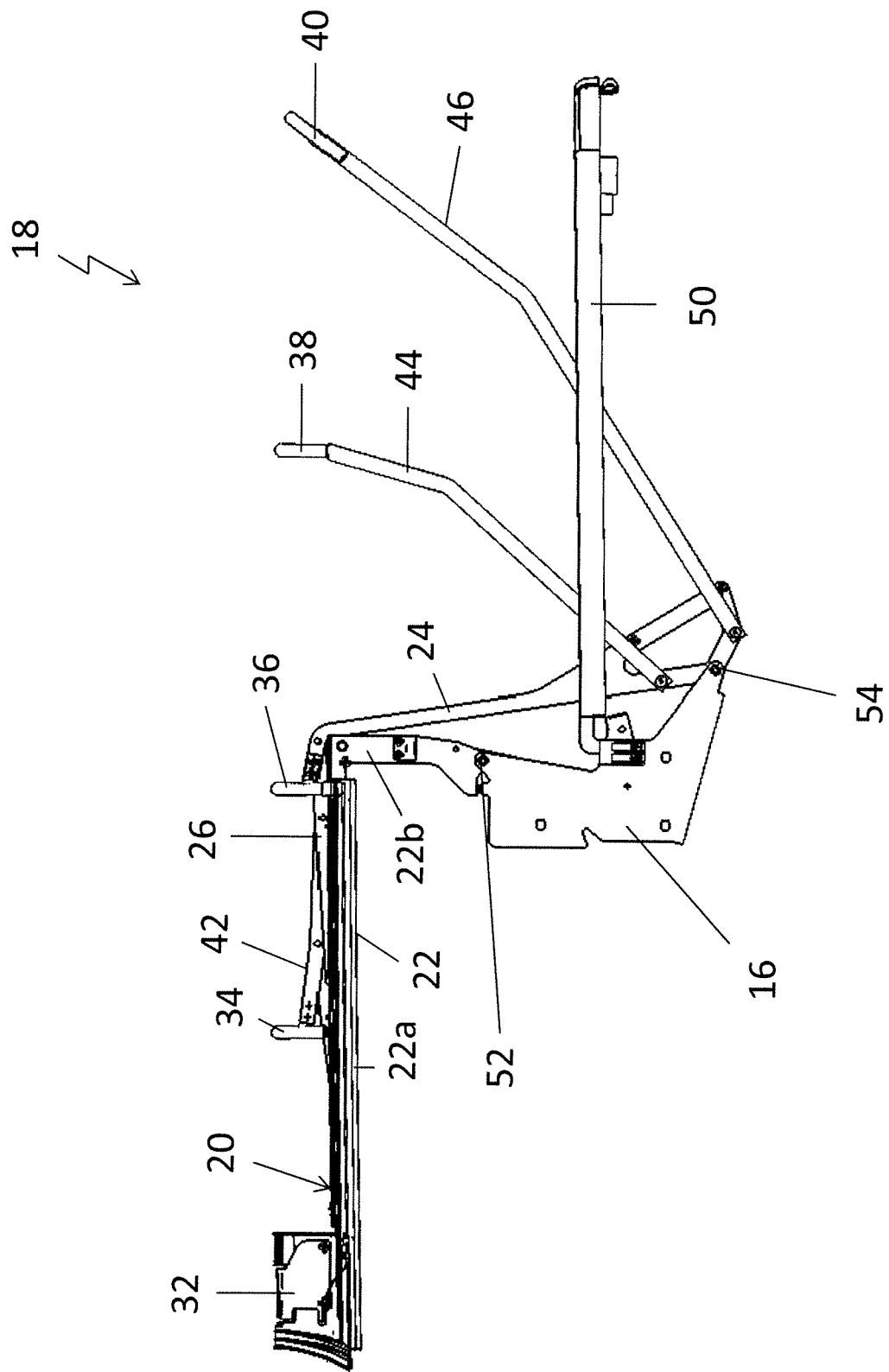
FIG. 5 is a view corresponding to FIG. 2, showing the top without a top cover.
Figure 6:
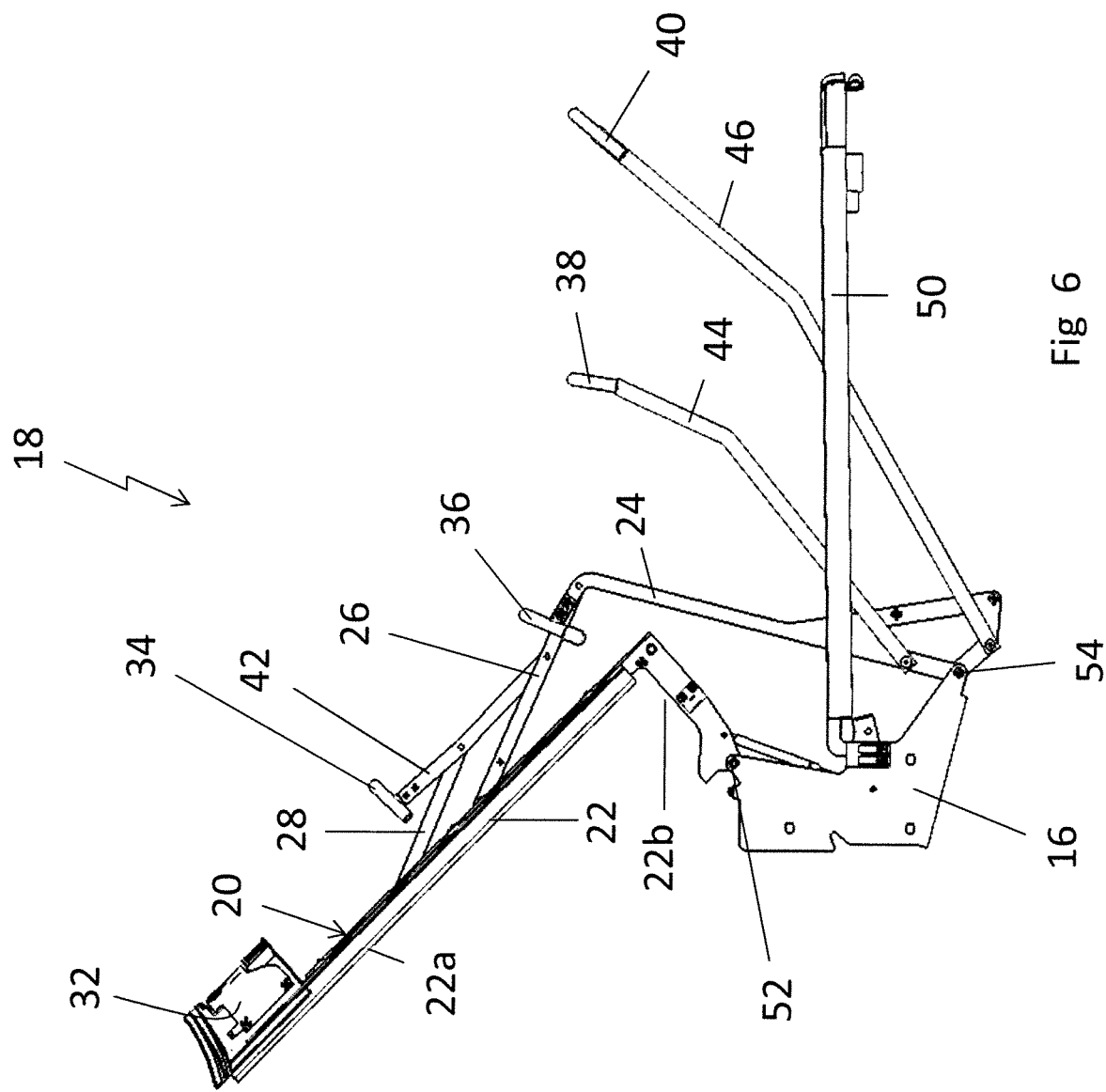
FIG. 6 is a view corresponding to FIG. 5, showing the top in a first intermediate position.
Figure 7:
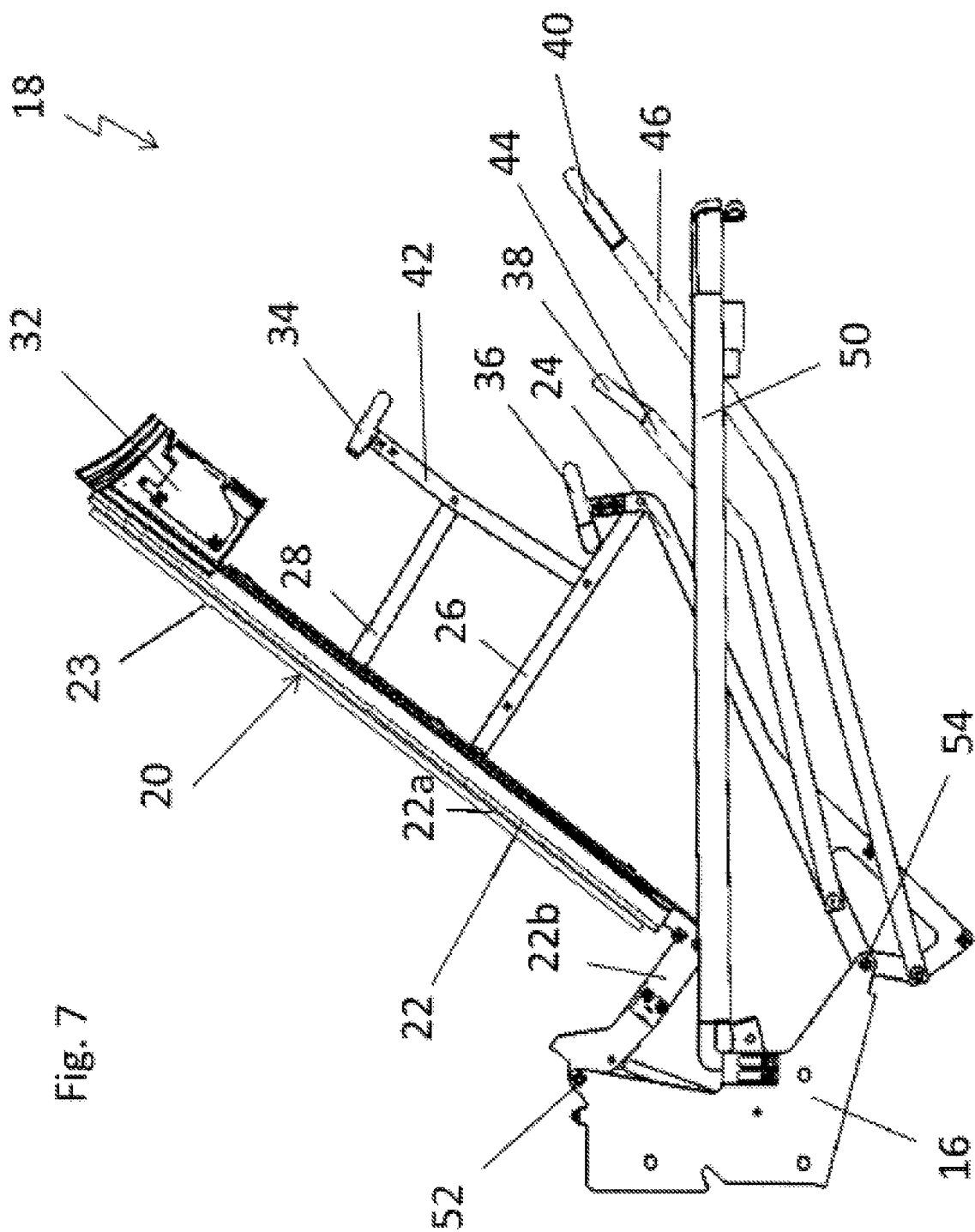
FIG. 7 is a view corresponding to FIG. 5, showing the top in a second intermediate position.
Figure 8:
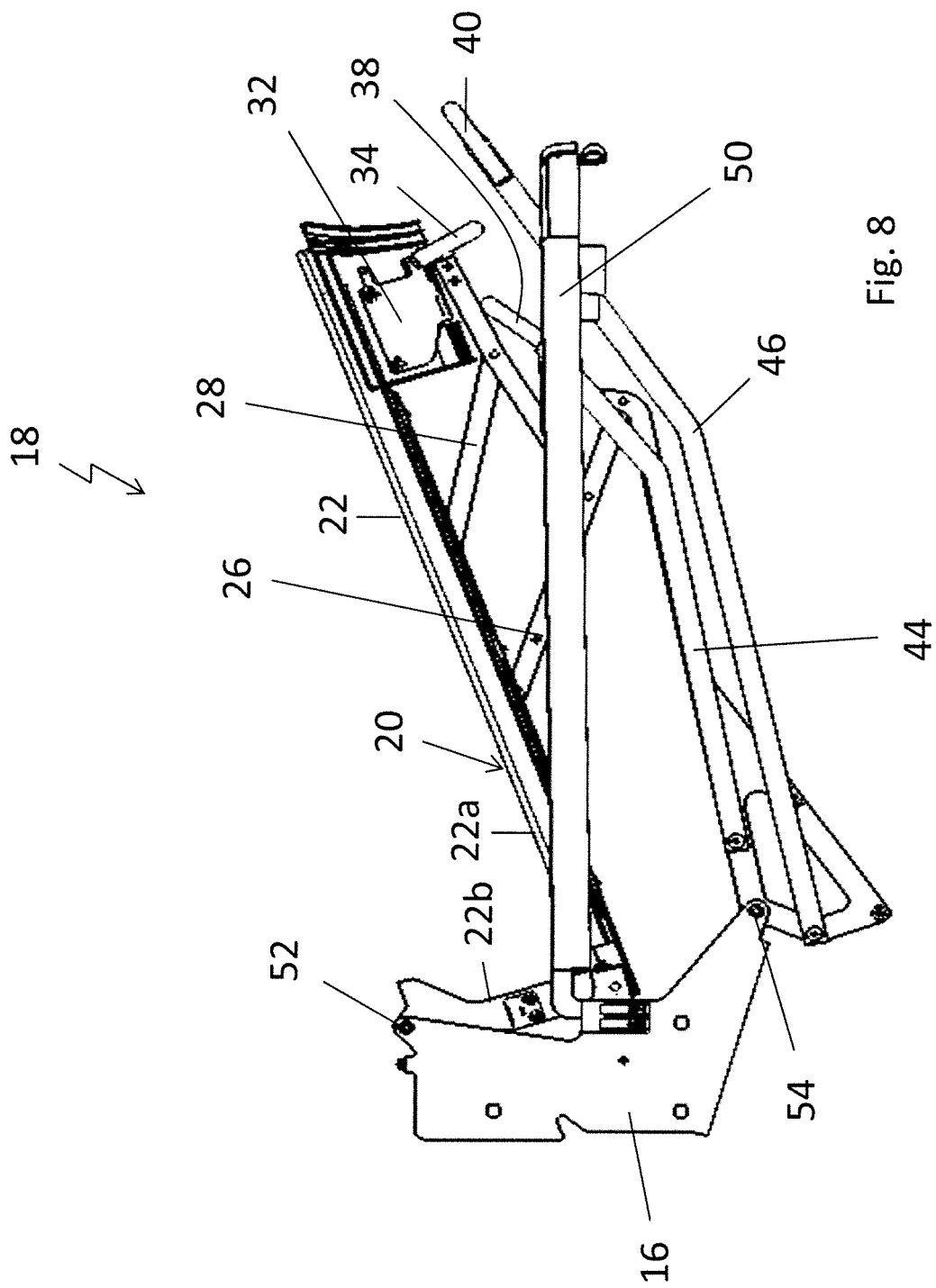
FIG. 8 is a view corresponding to FIG. 5, showing the top in the storage position.

Top 12 comprises a top cover 14 which can be displaced by means of a top linkage 18. Top linkage 18 can be displaced between the covering position, which is illustrated in FIGS. 1, 2, 3 and 5, and a storage position, which is shown in FIGS. 4 and 8. When top linkage 18 is in the storage position, the vehicle interior is open at the top and top 12 is stored in a rear storage space of vehicle body 62.

Top linkage 18 comprises a link assembly 20 on either side of a vertical longitudinal center plane of the top. Link assemblies 20 are mirror-symmetrical with respect to the longitudinal center plane of the vehicle, which is why, for the sake of clarity, only link assembly 20 on the left with respect to the forward direction of travel of the vehicle will be described below.

Link assemblies 20 each comprise a four-bar linkage having a first main link 22, a second main link 24, and a coupling link 26 connecting first main link 22 and second main link 24.

First main link 22 is L-shaped and comprises a long leg 22a and a short leg 22b. When the linkage assembly is in a covering position, long leg 22a extends in the longitudinal direction of the vehicle and short leg 22b extends in the vertical direction of the vehicle. Short leg 22b is pivotably mounted on a vehicle-attached main bearing 16 via a hinge point 52. In the covering position, long leg 22a forms a roof side beam having a weather strip 23. The front end of first main link 22 reaches or comes close to front header 64 of convertible vehicle 10. In the covering position, coupling link 26 runs approximately parallel to long leg 22a of main link 22.

A front bow 32 is rigidly attached to the front end of long leg 22a. Front bow 32 extends in the transverse direction of the vehicle between link assemblies 20 disposed on either side of the vertical longitudinal center plane of the top.

Second main link 24 is pivotably mounted on vehicle-attached main bearing 16 in a hinge point 54. At its end located at the top when in the covering position, second main link 24 is pivotably connected to coupling link 26.

Furthermore, top linkage 18 comprises three tube-like transverse bows 34, 36, 38 and a tube-like corner bow 40, which extend in the transverse direction of the roof and across which top cover 14 is stretched when in the covering position.

Front transverse bow 34 is rigidly attached to a bow link 42. Bow link 42, a control link 28 pivotably connected to first main link 22, and coupling link 26 together form a four-bar linkage, bow link 42 pivotably connecting control link 28 and coupling link 26.

Middle transverse bow 36 is rigidly attached to second main link 24, in particular to a protrusion of second main link 24, said protrusion extending in the longitudinal direction of the vehicle when in the covering position. Rear transverse bow 38 and corner bow 40 are each rigidly attached to a bow link 44 and 46, respectively, via which they are pivotably connected to second main link 24.

When top linkage 18 is in the covering position, corner bow 40 defines an area of transition of the top cover between a roof portion and vehicle rear 66.

A tensioning bow 50, which runs at the height of a beltline surrounding a cargo space and which surrounds the vehicle interior at the rear, is pivotably connected to vehicle-attached main bearings 16 disposed on either side of the longitudinal center plane of the vehicle.

REFERENCE SIGNS 10 convertible vehicle
12 top
14 top cover
16 vehicle-attached main bearing
18 top linkage
20 link assembly
22 first main link
22a long leg
22b short leg
24 second main link
26 coupling link
28 control link
32 front bow
34 transverse bow
36 transverse bow
38 transverse bow
40 corner bow
42 bow link
44 bow link
46 bow link
50 tensioning bow
52 hinge point
54 hinge point
62 vehicle body
64 front header
66 vehicle rear

The invention claimed is:

1. A top for a convertible vehicle, comprising: a top cover and a top linkage which can be displaced between a covering position, in which a vehicle interior is covered, and a storage position, in which the vehicle interior is open at the top, and which comprises, on either side of a vertical longitudinal center plane of the top, a link assembly having a four-bar linkage comprising a first main link, a second main link, and a coupling link, the first main link and the second main link each being pivotably mounted on a vehicle-attached main bearing, and a front bow which fixes the top to a front header of the vehicle in the covering position extending between the two link assemblies, wherein the front bow is rigidly attached to the first main link of the respective four-bar assembly on either side.

2. The top according to claim 1, wherein when the top linkage is in the covering position, the coupling link extends in the longitudinal direction of the vehicle and substantially parallel to a leg of the first main link.

3. A top for a convertible vehicle, comprising: a top cover and a top linkage which can be displaced between a covering position, in which a vehicle interior is covered, and a storage position, in which the vehicle interior is open at the top, and which comprises, on either side of a vertical longitudinal center plane of the top, a link assembly having a four-bar linkage comprising a first main link, a second main link, and a coupling link, the first main link and the second main link each being pivotably mounted on a vehicle-attached main bearing, and a front bow which fixes the top to a front header of the vehicle in the covering position extending between the two link assemblies, wherein the front bow is rigidly attached to the first main link of the respective four-bar assembly on either side, wherein a four-bar linkage is connected to each first main link, each four-bar linkage comprising a bow link, a control link, and the coupling link.

4. The top according to claim 1, wherein a transverse bow is rigidly attached to each second main link.

5. The top according to claim 1, wherein each second main link has a bow link pivotably mounted thereon.

6. The top according to claim 1, wherein a tensioning bow is pivotably mounted on the vehicle-attached main bearings disposed on either side of the vertical longitudinal center plane of the top.

7. The top according to claim 1, wherein the first main link is substantially L-shaped and comprises a long leg and a short leg the long leg extending in the longitudinal direction of the vehicle when the top linkage is in the covering position and the short leg extending in the vertical direction of the vehicle when the top linkage is in the covering position and being pivotably mounted on the vehicle-attached main bearing.

8. The top according to claim 7, wherein the long leg is a roof side beam having a weather strip.

9. A convertible vehicle having a top according to claim 1.

10. The top according to claim 3, wherein the coupling link is hinged to the first main link at one end and to the second main link at a second end.

* * * * *